United States Patent Office 3,544,260
Patented Dec. 1, 1970

---

3,544,260
PROCESS FOR DYEING SYNTHETIC LINEAR POLYESTER FIBROUS TEXTILE MATERIAL BLUE SHADES AND THE DYED MATERIAL
Guenter Lange and Hans Guenter Wippel, Ludwigshafen, Germany, assignors to Badische Anilin- & Soda-Fabrik Aktiengesellschaft, Ludwigshafen (Rhine), Germany
No Drawing. Continuation-in-part of application Ser. No. 546,496, May 2, 1966. This application Nov. 14, 1968, Ser. No. 775,959
Claims priority, application Germany, May 8, 1965, 1,544,373
Int. Cl. D06p *1/18*
U.S. Cl. 8—41                                                4 Claims

ABSTRACT OF THE DISCLOSURE

Process for dyeing synthetic linear polyesters such as polyethylene terephthalate using a specific para-aminoazo dye and giving blue dyeings with outstanding fastness properties.

---

This application is a continuation-in-part of our application Ser. No. 546,496, filed May 2, 1966 now abandoned, the disclosure of which is incorporated herein by reference as fully as if set forth in its entirety.

This invention relates to a process for producing a fast blue coloration on a synthetic linear saturated polyester fibrous textile material by applying thereto an aqueous dispersion of the dye of the formula:

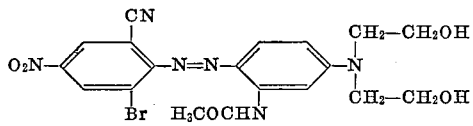

The dye used according to the invention is insoluble in water and belongs to the class of disperse dyes. It is known that disperse dyes, particularly those of the azo series, are suitable for dyeing hydrophobic fibers, for example cellulose acetate fibers, polyamide fibers or polyester fibers and a very large number of disperse dyes has been described in the literature. Numerous azo dyes for dyeing hydrophobic fibers are already commercially available (cf. Color Index (1956) and Supplement 1963). Some of these dyes are distinguished by very good fastness. In many cases, however, individual fastness properties are inadequate. Attempts have therefore been made to find dyes which satisfy the fastness requirements of the textile industry in every respect.

Particularly for dyeing synthetic linear polyesters, a high thermal resistance of the dye is now being required to an increasing extent because dyed fabrics are often subjected to heat treatments, for example pleating. Azo dyes giving blue dyeings having high fastness to dry-heat pleating and setting and good light fastness are however very rare, and blue anthraquinone dyes, which are also relatively rarely distinguished by high thermal fastness but which often have very good light fastness, are rather numerous but expensive. In order to avoid the use of high priced dyes in the production of fast blue dyeings attempts have been made to replace anthraquinone dyes by azo dyes because the latter usually have higher color strength and are more brilliant as well as cheaper.

This object has been achieved in accordance with the present invention by the use of the azo dye of Formula I which gives bright blue dyeings on polyester fibers which are distinguished by very good fastness, in particular by outstanding thermal fastness and good light fastness.

Synthetic linear saturated polyesters within the meaning of this invention are for instance the condensation products of ethylene glycol and terephthalic acid or p-dimethylolcyclohexane and terephthalic acid which may also be modified by the addition of up to 10% of other glycols and/or dibasic acids. Polyethylene terephthalate is especially suitable as the polyester.

Textile material made from such linear polyesters which may be dyed and/or printed with the dye of Formula I may be for example in the form of fibers, filaments, threads, flock, woven fabrics, knitted fabrics or non-woven fabrics.

The dye of Formula I is preferably used in high-temperature dyeing, i.e. at temperatures above 100° C. and preferably at temperatures between 120° and 140° C. The best results are obtained when the dyebath is slightly acidic, e.g. at a pH between 4.5 and 5.5. Another preferred mode of application of the dye is the thermosol process which uses temperatures between 180° and 220° C. Conventional dispersing agents can be used, such as those commonly employed in this art for homogeneously distributing a water-insoluble azo dye in an aqueous medium.

The invention is illustrated by the following example in which parts are by weight.

EXAMPLE 100 parts of a polyethylene terephthalate cloth is treated for forty-five minutes at 125° C. in a dye liquor which contains 1000 parts by volume of water, 2 parts of a dispersing agent obtained by reaction of 1 mole of sperm oil alcohol with 80 moles of ethylene oxide followed by sulfonation, 5 parts by volume of acetic acid (30%) and 0.6 part of the finely divided dye having the Formula I. A blue dyeing having very good color strength and outstanding fastness properties is obtained.

The fastness to light determined according to the Xeno Test or by Fade-Ometer methods is 5 to 6, the fastness to daylight is 6. These values are obtained by comparison with the standard blue scale which has eight steps.

The fastness to contact heat at 210° C. for 30 seconds was found to be 4 to 5, 5 being the best value obtainable. The fastness to contact heat is determined by placing a specimen of the dyed textile in close contact with an undyed specimen between two plates heated to 210° C. The change in color of the specimen and the staining of the undyed cloth is assessed with standard grey scales.

The dye of Formula I may be obtained by the following procedure: 12.1 parts of 2-amino-3-bromo-5-nitrobenzonitrile is introduced at a temperature of 0° to 5° C. into a solution consisting of 50 parts of concentrated sulfuric acid and 14.5 parts of nitrosylsulfuric acid having a content of 13.1% of free dinitrogen trioxide, and the resultant solution is stirred for three hours at 0° to 5° C. The clear diazo solution obtained is allowed to flow slowly into a solution consisting of 11.9 parts of 3-acetylamino-N,N-di-(β-hydroxyethyl) - aminobenzene, 25 parts of water, 6 parts of concentrated hydrochloric acid, 100 parts of ice and 1 part of amidosulfonic acid. Stirring is continued for one hour and then a solution of 41 parts of sodium acetate in 200 parts of water is added and the crystalline dye is filtered off wtih suction, washed neutral with water and dried at 40° C. under subatmospheric pressure.

We claim:

1. A process for producing fast blue dyeings on the synthetic linear polyester fibrous textile material which comprises: dyeing said material with an aqueous dispersion of the dye of the formula:

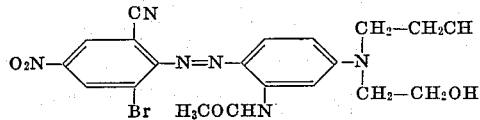

2. A process as claimed in claim 1 wherein the polyester is polyethylene terephthalate.

3. A synthetic linear polyester fibrous textile material dyed with the compound of the formula:

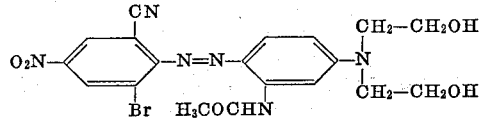

4. A dyed textile material as claimed in claim 3 wherein the polyester is polyethylene terephthalate.

References Cited

UNITED STATES PATENTS 3,178,405    4/1965    Merian _____ 260—207.1X

GEORGE F. LESMES, Primary Examiner

T. J. HERBERT, Jr., Assistant Examiner

U.S. Cl. X.R.

8—176, 179; 260—207.1